April 12, 1927.　　　　　　　　　　　N. YOUNG　　　　　　　　　1,624,456
FISHING DEVICE
Filed July 14, 1926　　　2 Sheets-Sheet 1
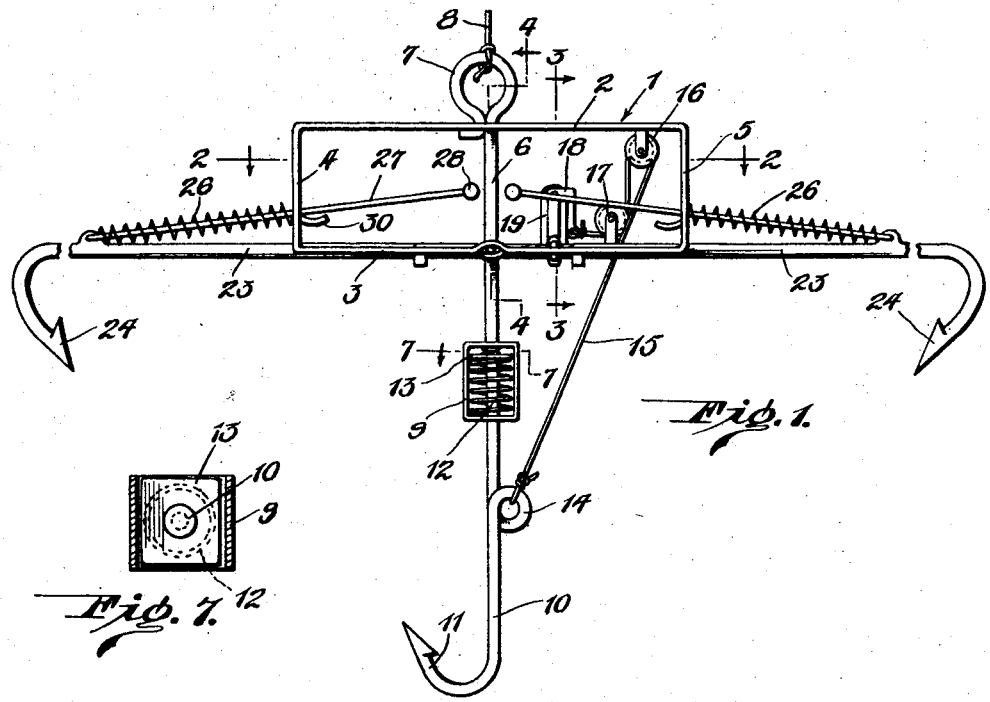
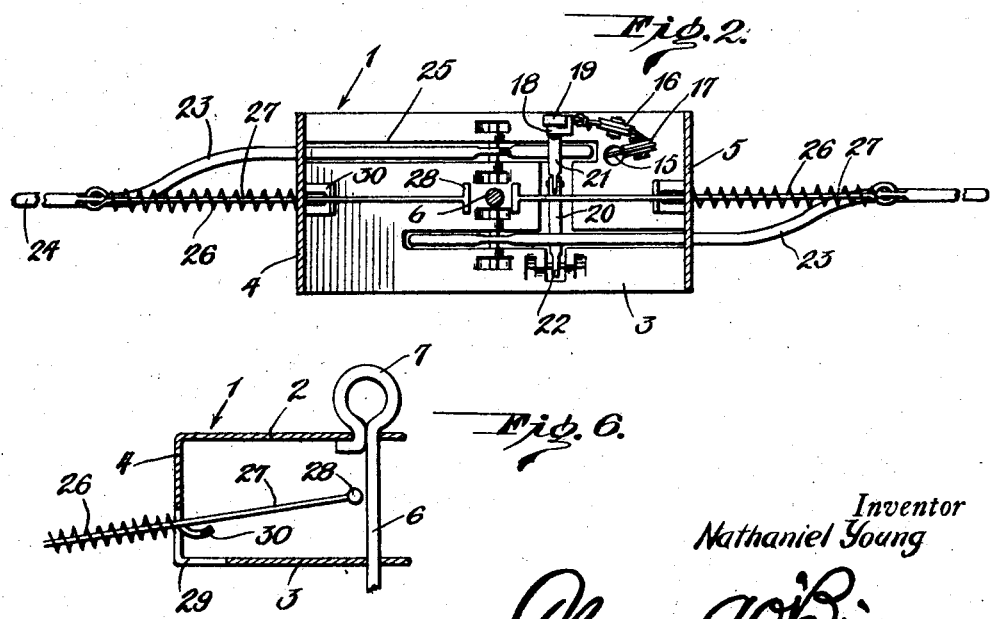
Inventor
Nathaniel Young
By Clarence A. O'Brien
　　　　　　　　　Attorney April 12, 1927.
N. YOUNG
1,624,456
FISHING DEVICE
Filed July 14, 1926   2 Sheets-Sheet 2
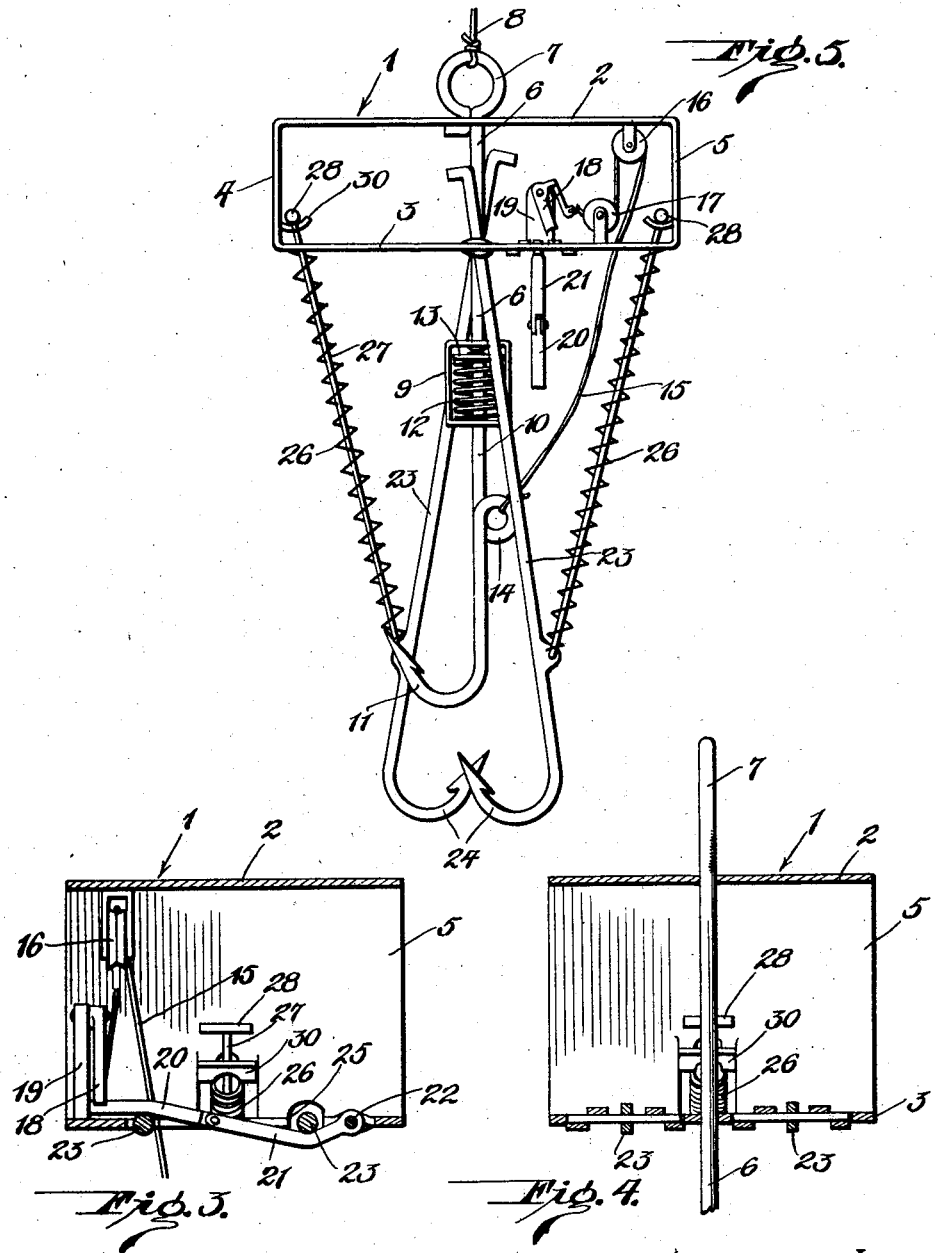
Inventor
Nathaniel Young
By Clarence A. O'Brien
Attorney Patented Apr. 12, 1927.

1,624,456

UNITED STATES PATENT OFFICE.

NATHANIEL YOUNG, OF HICKMAN, KENTUCKY.

FISHING DEVICE.

Application filed July 14, 1926. Serial No. 122,401.

This invention relates to an improved device for catching fish, and it has reference to a device of this class which includes a plurality of hooks, one of which carries the bait and the other two of which are employed to act as automatic jaws for gripping the fish as soon as the bait is nibbled upon.

Briefly, the invention has reference to a frame upon which the main bait carrying hook is suspended, the jaw forming hooks being swingably mounted on opposite sides of the main hook, and means being associated with the main hook for releasing an automatically operable retaining device for allowing the jaw hooks to come into play.

My primary object is to provide a device of this kind wherein the parts are of novel construction and are arranged in a novel association, which serves to produce a comparatively simple and inexpensive device which may be used successfully by rather unskilled fishermen.

Other features and advantages of the invention will become apparent from the following description and drawings.

In the accompanying drawings forming a part of this application, and in which like numerals are employed to designate like parts throughout the same:—

Figure 1 is an elevational view of a fishing device constructed in accordance with this invention, showing the jaws in readiness to be tripped for action.

Fig. 2 is a section taken approximately upon the plane of the line 2—2 of Fig. 1.

Figs. 3 and 4 are enlarged vertical sections taken approximately upon the planes of the lines 3—3 and 4—4 respectively of Fig. 1.

Fig. 5 is a view like Fig. 1, showing the jaws in operative position.

Fig. 6 is a detail view of a stop, and

Fig. 7 is a section on the line 7—7 of Fig. 1.

Referring to the drawings in detail, it will be seen that the reference character 1 designates generally an elongated rectangular supporting frame including top and bottom bars 2 and 3 respectively, and end bars 4 and 5. Extending through an opening in the top bar and through a registering opening in the bottom bar, is a wire rod 6 which is formed at its upper end with an eye 7 to which a fishing line 8 is attached. This rod 6 extends below the bottom plate and is swivelly connected with an appropriate coupling 9. Then, the shank 10 of the bait carrying hook 11 passes upwardly through the coupling and abuts the head on the lower end of the rod 6.

A coiled spring 12 surrounds the headed end of the shank 10 and presses against a plate 13 carried by the shank 10. The intermediate portion of the shank 10 is formed with an eye 14 with which one end of a cord 15 is connected. This cord 15 passes over a pulley 16 carried by the top bar 2, then over a second pulley 17 mounted on the bottom bar 3. The end of the cord is attached to a releasing trip or latch 18 mounted on a standard 19. It will be noticed that the lower end of this latch 18 is rounded and rests upon one link 20 of a release device. The other link 21 is pivotally connected as at 22 to the frame bottom 3 as shown plainly in Fig. 3. The bottom 3 is provided with openings to accommodate these links which serve in a manner to be hereinafter made plain.

As before stated there are two jaws which cooperate with the bait carrying hooks, and each jaw comprises a rod 23 terminating in a hook 24. These rods are adapted to operate within slots 25 formed in the bottom of the frame 1. It will be noticed that one rod 23 fits in a curved seat formed at the center of one of the links 21. By referring to Fig. 3 it will be seen that this rod extends over the top of the link 21. On the other hand, the other rod 23 extends beneath the central bend of the link 20, and the link 20 is of course normally engaged with the latch 18.

The rods 23 are moved to gripping position by coiled springs 26 which surround the arms 27 and bear at one end against the bottom of the frame 1. Moreover by directing attention to Fig. 6, it will be seen that the frame is formed with slots 29 to accommodate the upper end portions of the arms 27. In addition, stops are struck out at this point and cooperate with heads 28 on the upper ends of the arms 27 to limit the downward movement of the jaws as indicated in Fig. 5.

Assuming that the latch 18 is engaged with the link 20 and the rods 23 are disposed beneath and above the links 20 and 21 respectively, as indicated in Fig. 3, it is obvious that the spring operated jaws will be in the ineffective state indicated in Fig. 1. The bait will have, of course, been placed upon the hook 11. When the fish bites a slight pull will be exerted upon the parts 10 and 11, but the spring 12 in the coupling 9 will permit slight movement here. However, after a predetermined pull has been placed upon the hook 11, the cord 15 will be pulled upon, and as this is attached to the latch 18, the latch will be tripped, thus allowing the links 20 and 21 to break joint and to turn in and permit the rod 23 and jaw 24 to be swung down to grip the fish. Ordinarily, with a single hook, the fish would get away, but here, a slight pull upon the bait will serve to automatically permit the jaws to swing down and grab the fish, thus preventing its escape.

It has been found that a device of this kind may be operated very successfully by an unskilled hand. It is believed that by carefully considering the description in connection with the drawings, that persons familiar with devices of this kind will be able to obtain a clear understanding of the same. For this reason, a more lengthy description is thought unnecessary.

While the preferred embodiment of the invention has been shown and described, it is to be understood that minor changes coming within the field of invention claimed, may be resorted to if desired.

Having thus described my invention, what I claim as new is:

1. In a fishing device of the class described, an elongated supporting frame, a sectional bait hanging hook, a pair of jaws swingably mounted upon said frame and movable in a direction at right angles toward said hook, spring means for automatically actuating said jaws, said frame being provided at its bottom with slots for accommodating portions of said jaws, a retaining device comprising links pivotally mounted upon said frame and cooperable with the jaws for maintaining them normally in an ineffective state, a pivotally mounted latch cooperable with said retaining device, pulleys on said frames, and a flexible element connected with said latch, passing over said pulleys, and connected with said bait hook.

2. In a fishing device of the class described, an elongated supporting frame, a bait supporting hook composed of relatively movable sections, spring means associated with the adjacent ends of said sections, a pair of jaws swingably mounted upon the frame and movable in a direction at right angles toward said hook, spring means for automatically actuating said jaws, said means comprising coiled springs, arms pivotally connected to the intermediate portion of the jaws, the coiled springs surrounding said arm and bearing at one end against the frame, the frame being formed with slots and adjacent said slots are stops, and said arms extending through said slots and having heads cooperating with said stops.

In testimony whereof I affix my signature.

NATHANIEL YOUNG.